United States Patent [19]

Stauffer

[11] Patent Number: 4,822,995
[45] Date of Patent: Apr. 18, 1989

[54] LINEAR ARRAY MIRROR SYSTEM

[75] Inventor: Norman L. Stauffer, Englewood, Colo.

[73] Assignee: Honeywell Inc., Minneapolis, Minn.

[21] Appl. No.: 121,696

[22] Filed: Nov. 16, 1987

[51] Int. Cl.[4] .............................................. H01J 3/14
[52] U.S. Cl. .................................. 250/216; 250/578; 250/234
[58] Field of Search ......................... 350/6.5, 6.7, 6.8; 250/203 R, 578, 235, 234, 236, 568, 566, 216; 235/467, 470, 459–461

[56] References Cited

U.S. PATENT DOCUMENTS

| | | | |
|---|---|---|---|
| 3,947,816 | 3/1976 | Rabedeau | 350/6.8 |
| 4,006,343 | 2/1977 | Izura et al. | 250/203 R |
| 4,018,504 | 4/1977 | Wu et al. | 350/6.8 |
| 4,057,784 | 11/1977 | Tafoya | 350/6.7 |
| 4,093,865 | 6/1978 | Nickl | 350/6.7 |
| 4,527,055 | 7/1985 | Harkless et al. | 350/6.7 |
| 4,738,499 | 4/1988 | Mikami et al. | 350/6.7 |

OTHER PUBLICATIONS

Godwin, "A Simple Low-Cost Scanner", *Laser Focus*, vol. 17, No. 10, 10/81, pp. 91-93.

Primary Examiner—David C. Nelms
Assistant Examiner—Michael Messinger
Attorney, Agent, or Firm—Charles J. Ungemach

[57] ABSTRACT

A viewing system for utilizing a linear array of detectors so that they may view the remote object in two separate directions by use of mirrors to reflect energy from the object to the row of detectors.

27 Claims, 2 Drawing Sheets

4,822,995

LINEAR ARRAY MIRROR SYSTEM

BACKGROUND OF THE INVENTION

1. Field of the Invention.

The present invention relates to an optical system for viewing and detecting in two dimensions utilizing a one dimensional array of detectors.

2. Description of the Prior Art.

Apparatus for viewing and determining the position of a remote object utilizing optical means is known in the art. For example, the Honeywell HVS-256 utilizes a lens located in front of a linear array of radiation responsive detectors. Objects coming within the field of view of the lens are "seen" by one or more of the detectors. Depending upon which of the detectors "sees" the object, the position of that object within the field of view can be determined along the direction of the linear array. Unfortunately, all that the linear array of the detectors can "see" is a line on the remote object parallel to the array. Thus, the position of the remote object along that direction is determinable by observing which detectors produce an output because of the remote object. The position of the object in other directions, for example perpendicular to the direction of the array, cannot be determined in the prior art since motion of the object in such direction does not necessarily change the output of the detectors. Determining the position of the object in both of the directions is often desirable and, although an additional row of detectors parallel to the desired direction may be employed, the provision of additional detectors is expensive, space consuming, unnecessarily complex and generally undesirable.

SUMMARY OF THE INVENTION

To overcome this difficulty in the prior art, the present invention employs a plurality of mirrors so arranged with respect to the remote object that the axis being viewed by the linear array of detectors is split into two or more portions, at least one of which views the object in a first direction and another of which views the object in another desired direction to provide information as to the position of the object in both directions.

DETAILED DESCRIPTION OF THE PREFERRED EMBODIMENTS

Figure 1:
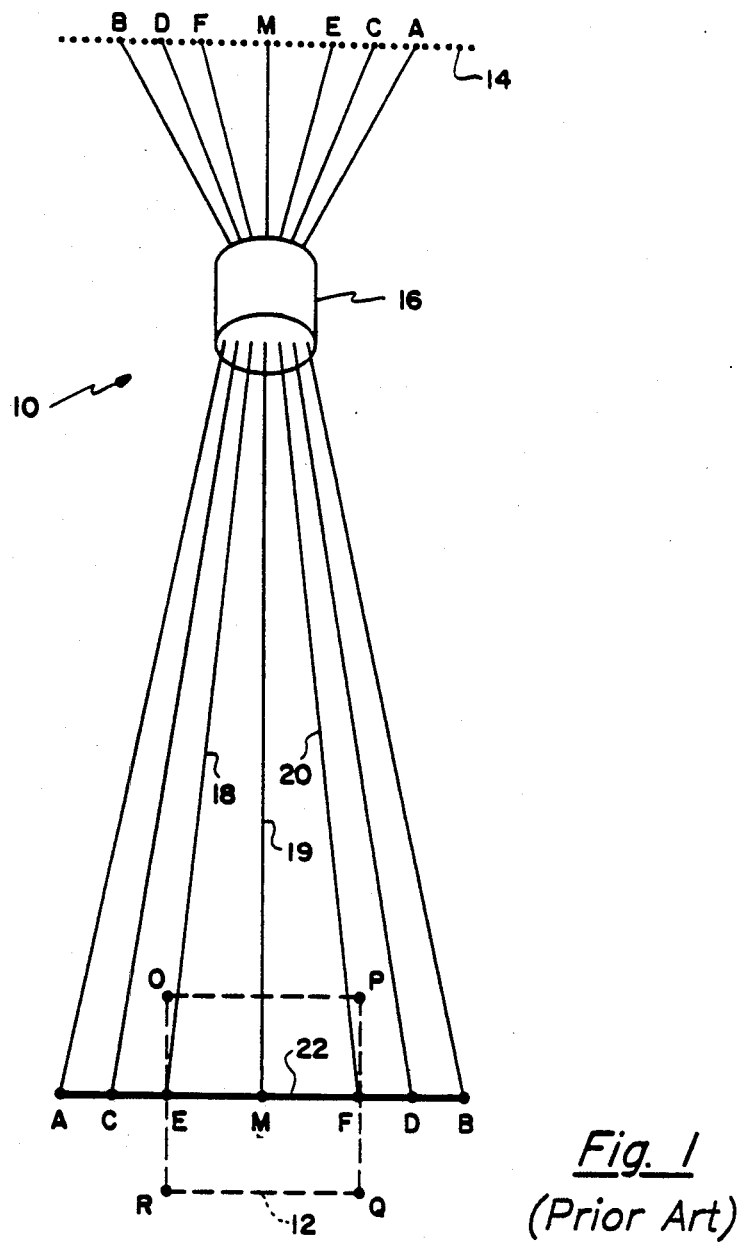
FIG. 1 shows a one dimensional viewing system including a lens and a linear array of detectors like the Honeywell HVS 256.

FIG. 1 shows the optical arrangement 10 of the above-mentioned Honeywell HVS-256. This device is arranged to detect the width or edge position of remote objects such as, for example, a label shown as dashed rectangle 12 with corners O, P, Q, and R which may be located on a carton passing along a conveyor belt (not shown). It may be desired to know whether or not the label is placed upon the carton in the proper position.

The optical system 10 includes a straight row of radiation detectors 14 which may include, for example, 256 individual CCD elements, each operable to produce an output indicative of the amount of radiation received thereby. A lens 16 in optical system 10 receives radiation from the label 12 along paths such as 18, 19, and 20 representing radiation from a point E which intersects the O-R edge of label 12, from a point M which is the center of label 12 and from a point F which intersects the edge P-Q of label 12 respectively. Rays 18, 19, and 20 pass through lens 16 and are imaged on detectors 14 at corresponding points E, M, and F thereon. Radiation is also received from other points on and about label 12 such as points A, C, D, and B which are shown in FIG. 1 imaged by lens 16 at points A, C, D, and B in the row of detectors 14. Since the detectors 14 are in a straight line, the area that they can "see" on the remote object, is a similar straight line 22 which contains all of the points from A to B as well as those in between. Since the label 12 will have a different luminance than the area surrounding it, radiation received between points E and F on line 22 will cause the detectors between points E and F on detectors 14 to produce different outputs than the rest of the detectors and accordingly, by determining which of the detectors in row 14 produce different signal outputs, the position of and the distance between points E and F can be determined.

The difficulty is, however, that while the horizontal position E-F can be determined with the system of FIG. 1, no information is available as to the position of label 12 in any other direction such as perpendicular to E-F. Thus, label 12 could move upwards or downwards in FIG. 1 and produce exactly the same output from detectors 14. Of course, a second row of detectors such as 14 could be placed in the image plane of lens 16 and in a direction perpendicular to the row 14 so as to detect the vertical position of label 12 in FIG. 1, but this would require the additional expense and complexity of another row of detectors.

Figure 2:
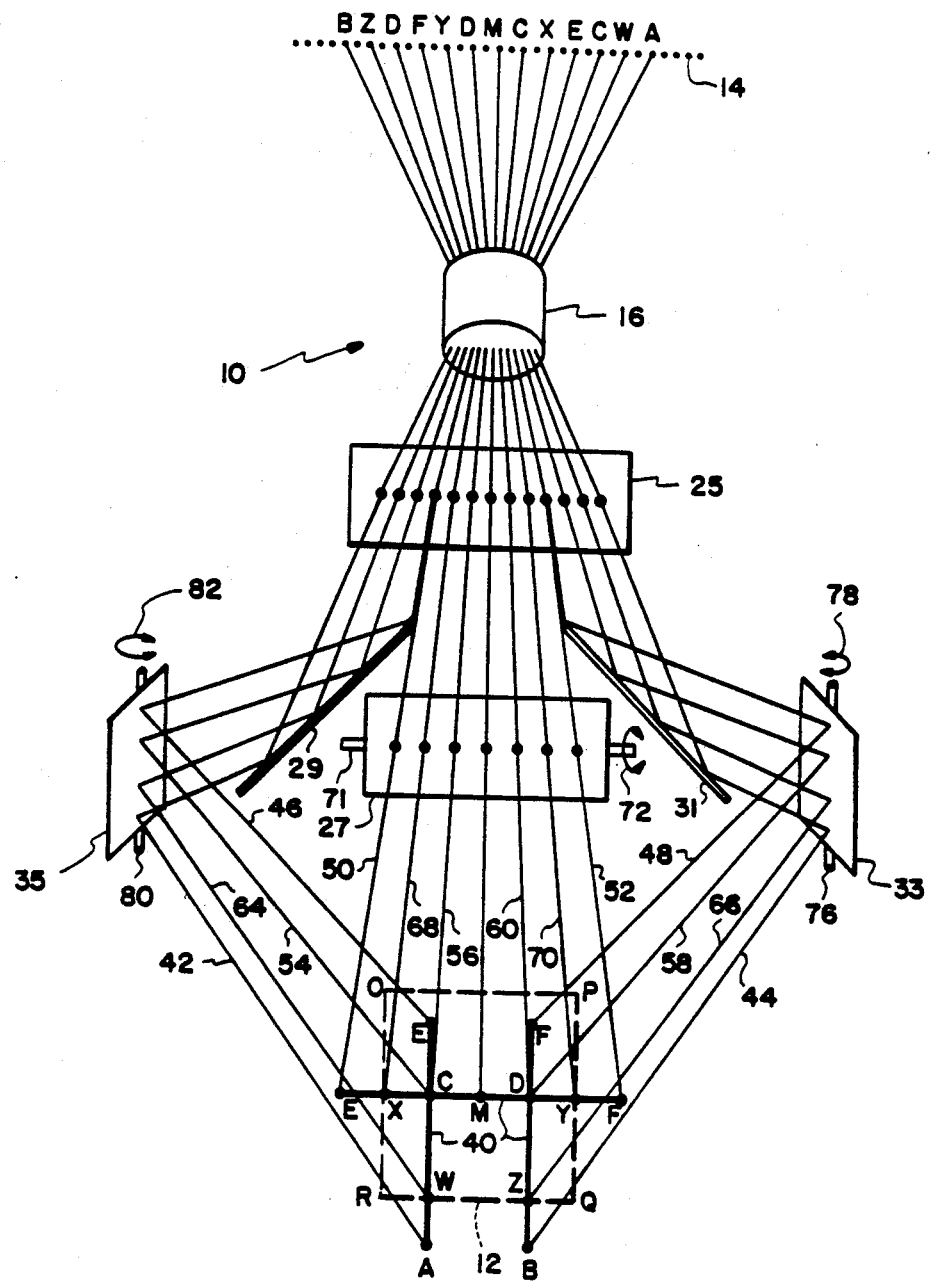
FIG. 2 shows one embodiment of the present invention including the lens and detectors of FIG. 1 but with the addition of mirrors to provide a two dimensional "H" shaped view for the system.

A novel solution to the problem is shown in FIG. 2 in which elements having the same function as in FIG. 1 also have the same reference numeral. In FIG. 2, the label 12 is again shown in dashed lines and radiation therefrom is received by lens 16 so as to produce an image on the horizontal row of detectors 14. Instead of receiving light from label 12 directly as was the case in FIG. 1, a plurality of mirrors identified by reference numerals 25, 27, 29, 31, 33, and 35 are employed to receive the radiation and to reflect it from one another so that it reaches lens 16 in the same general fashion as it did in FIG. 1 to produce a linear image along the line of detectors 14. Because of the mirrors, however, the line of detectors 14 no longer sees a straight line view of label 12 but, instead, sees a "goal post" or H-shaped image 40 which, after passing through the mirror system, will emerge from lens 16 as a straight line. More particularly, a ray of energy from the bottom point A of the left hand vertical will travel along a path 42 to mirror 35 where it is reflected to mirror 29 and then to mirror 25 where it is reflected to lens 16 and is imaged on the detectors 14 at the far right position A. Similarly, energy from the bottom point B of the right hand vertical travels along a path 44 to mirror 33 where it is reflected to mirror 31 and then to mirror 25 for reflection to lens 16 and is imaged at the far left point B on detectors 14. Points E and F representing the upper points of the left and right vertical lines emit energy along paths 46 and 48 to mirrors 35 and 33 for reflection to mirrors 29 and 31 and then to mirror 25 and lens 16 to be focused at points E and F on detectors 14 respectively. The horizontal line is shown having end points also identified as E and F because, energy from these two points merges in the system with energy from the top points E and F of the verticals so as to be imaged on detectors 14 at the same points. More particularly, the point E on the left end of the horizontal emits energy along a path 50 to mirror 27 where it is reflected to mirror 25 and strikes mirror 25 at the same point as energy from point E at the top of the left hand vertical so that thereafter they join to become a single path through lens 16 to be focused at point E on the detector row 14. Similarly, point F on the far right end of the horizontal line emits energy along a path 52 to mirror 27 where it is reflected to mirror 25 at the same point that path 48 from the top point F of the right hand vertical reached mirror 25 and thereafter these two paths merge through lens 16 to be imaged at point F on detector row 14. The situation is as if the plane of paths 18, 19, and 20 in FIG. 1 were cut along lines 18 and 20 between point E and F and lens 16 and then these two edge pieces including points A, C, and E and points F, D, and B in FIG. 1 were twisted perpendicular to line EMF and positioned to intersect between E and M and between M and F, respectively. The goal-post shaped figure thus formed by so cutting FIG. 1 would correspond to shape 40 of FIG. 2. It should be noted that the intersection points C and D of the vertical lines A-E and B-F with the horizontal line E-F emit energy which travels to lens 16 over two paths. More particularly, point C emits energy along a path 54 to mirror 35 and along a path 56 to mirror 27. Point D emits energy along a path 58 to mirror 33 and along a path 60 to mirror 27. This energy is reflected to mirror 25 and to lens 16 so as to form two images of points C and D on the row of detectors 14. It is seen that the vertical line ACE is imaged on the detectors 14 over the right hand portion of the detectors while the vertical line BDF is imaged on the left hand portion of the detectors with the horizontal line ECDF occupying the middle portion of the detectors. It is also seen that the row of detectors 14 now "sees" both horizontally and vertically and this feature enables the detection of the image of label 12 in both horizontal and vertical directions. More particularly, the vertical line ACE intersects the lower edge of label 12 along line RQ at point W while the vertical line BDF intersects label 12 along the lower edge between points R and Q at point Z. The horizontal line ECDF intersects label 12 along the left hand edge O-R at point X and along the right hand edge P-Q at point Y. Radiation from point W travels along a path 64 to mirror 35 where it is reflected to mirror 29 and mirror 25 and is imaged between points A and C at point W on detectors 14. Point Z emits energy along a path 66 to mirror 33 where it is reflected to mirror 31 and mirror 25 and is imaged as point Z between points B and D on detectors 14. Point X emits energy along a path 68 to mirror 27 and then to mirror 25 to be imaged at point X between points F and D on detectors 14 and point Y emits energy along a path 70 to mirror 27 and mirror 25 to be imaged at point Y between points C and E on detectors 14.

Since label 12 emits radiation differently than its background, point W can be determined by how many detectors it is away from point A and point Z can be detected by how many detectors it is away from point B. Thus, the vertical placement of label 12 can be determined. Points X and Y will produce signals from the detectors 14 like they did in connection with FIG. 1 and a determination of the horizontal position of label 12 can be determined by the number of detectors between points E and X and points F and Y.

It is thus seen that with the arrangement of FIG. 2, label 12 can be positioned both horizontally and vertically. Likewise, as was the case in connection with FIG. 1, any angular misplacement of label 12 will be detected by a difference in the distance between points A and W and points B and Z.

Figure 3:
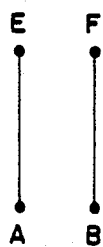
FIG. 3 shows a parallel line shaped view for the system.
Figure 4:
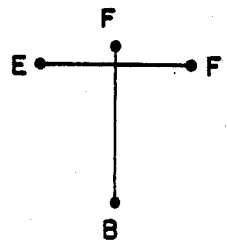
FIG. 4 shows a "T" shaped view for the system.
Figure 5:
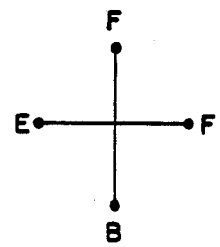
FIG. 5 shows a "+" shaped view for the system.
Figure 6:
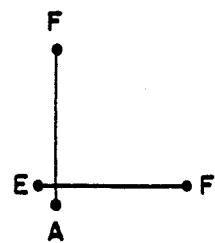
FIG. 6 shows an "L" shaped view for the system.

The specific "goal-post" configuration of FIG. 2 is not the only configuration obtainable by use of the mirrors 25, 27, 29, 31, 33, and 35 and many other configurations are possible. To this end, mirror 27 is shown mounted on a pivot 71 which is rotatable in the direction shown by arrow 72. Rotation of mirror 27 will cause the horizontal line E-F to move up and down in FIG. 2. Similarly, mirror 33 is shown having a pivot 76 so that it is rotatable in a direction shown by arrow 78. Rotation of mirror 33 will cause vertical line FB to move to the right and left in FIG. 2. Similarly, mirror 35 is shown having a pivot 80 so as to be rotatable in a direction shown by arrows 82. Rotation of mirror 35 will cause right and left hand movement of vertical line AE in FIG. 2. Furthermore, one or more of the mirrors may be removed entirely to create different views. For example, if mirror 27 were removed, then the lens 16 would not receive energy from the horizontal bar EF and accordingly the detectors 14 would only be "seeing" the vertical lines AE and BF. This view is shown in FIG. 3. If the left hand mirror 35 were removed, then vertical line AE would disappear. If this were followed by a slight rotation of mirror 33 so that vertical line BF was moved to the left and then if mirror 27 were rotated slightly so that line EF was moved upwardly, then a cross or T shaped arrangement would result. This view is shown in FIG. 4. Thereafter, rotating mirror 27 in the opposition direction slightly, line EF would be moved downwardly so that a "+" shaped FIGURE would result. This view is shown in FIG. 5. Rotation of the entire system including detectors 14, mirrors 25, 27, 29, 31, 33, and 35, would result in rotating the "+" shape of FIG. 5 so that it became a "X". If mirror 33 were removed, the vertical line BF would disappear and then, if mirror 27 were rotated so as to move line EF downwardly, a "L" shaped figure would result. This view is shown in FIG. 6.

Accordingly, it can be seen that with the mirror arrangement shown in FIG. 2, a wide variety of different views can be had by a single horizontally arranged line of detectors.

Mirror arrangements other than that shown in FIG. 2 may also be employed to create other shapes and accordingly, I do not wish to be limited to the specific disclosures used in connection with the preferred embodiments.

The embodiments of the invention in which an exclusive property or right is claimed are defined as follows:

1. Apparatus for use in an optical system which includes imaging means for imaging radiation from a remote object on a linear array of detectors, comprising:
   first reflecting means for directing radiation from a first line on the remote object to the imaging means to be imaged on a first portion of the array; and,
   second reflecting means for directing radiation from a second line on the remote object to the imaging means to be imaged on a second portion of the array, the first and second lines being non colinear.

2. Apparatus according to claim 1 wherein the first and second lines are parallel.

3. Apparatus according to claim 1 wherein the first and second lines intersect at an angle.

4. Apparatus according to claim 3 wherein the angle is ninety degrees.

5. Apparatus according to claim 4 wherein the first and second lines form a "T" shape.

6. Apparatus according to claim 4 wherein the first and second lines form a "L" shape.

7. Apparatus according to claim 4 wherein the first and second lines form a "+" shape.

8. Apparatus according to claim 1 further including third reflecting means for directing radiation from a third line on the remote object to the imaging means to be imaged on a third portion of the array, the third line being non colinear with either of the first and second lines.

9. Apparatus according to claim 8 wherein the third line is perpendicular to the first and second lines.

10. Apparatus according to claim 9 wherein the first, second and third lines form an "H" shape.

11. Apparatus accirding to claim 1 wherein the first reflecting means is adjustable so as to direct radiation from different lines on the remote object to the imaging means.

12. Apparatus according to claim 1 wherein the first and second reflecting means are adjustable so as to direct radiation from different lines on the remote object to the imaging means.

13. Apparatus according to claim 8 wherein the first, second and third reflecting means are adjustable so as to direct radiation from different lines on the remote object to the imaging means.

14. Apparatus according to claim 11 wherein the first reflecting means is mounted for rotation about an axis substantially parallel to the first line on the remote object.

15. Apparatus according to claim 12 wherein the first and second reflecting means are mounted for rotation about first and second axes respectively, the first of the axes being substantially parallel to the first line on the remote object and the second of the axes being substantially parallel to the second line on the remote object.

16. Apparatus according to claim 13 wherein the first, second and third reflecting means are mounted for rotation about first, second and third axes respectively, the first of the axes being substantially parallel to the first line on the remote object, the second of the axes being substantially parallel to the second line on the remote object and the third of the axes being substantially parallel to the third line on the remote object.

17. Apparatus according to claim 16 wherein the second and third of the axes are substantially parallel to each other.

18. Apparatus according to claim 17 wherein the first of the axes is substantially parallel to a plane which includes the second and third of the axes.

19. An optical system comprising:
a plurality of radiation responsive detectors arranged along a substantially straight line; and,
radiation transmitting means positioned to receive radiation from a predetermined portion of a remote object, the predetermined portion including first and second non colinear lines on the object and the radiation transmitting means operating to direct the radiation from the first and second lines so as to arrive at the detectors substantially colinearly along the straight line.

20. Apparatus according to claim 19 wherein the radiation transmitting means includes first reflecting means to receive radiation from the first line on the object and reflect such radiation to the detectors substantially along the straight line thereof.

21. Apparatus according to claim 20 wherein the first reflecting means is rotatable so that the position of the first line on the object may be changed.

22. Apparatus according to claim 20 further includes second reflecting means to receive radiation from the second line on the object and reflect such radiation to the detectors substantially along the straight line thereof.

23. Apparatus according to claim 22 wherein the first and second reflecting means are each rotatable so that the positions of the first and second lines on the object may be changed.

24. The method of transmitting radiation from first and second non colinear lines to fall on a linear array of detectors comprising the steps of:
A. positioning first reflecting means to reflect radiation from the first line so that it falls on a first portion of the array; and,
B. positioning second reflecting means to reflect radiation from the second line so that it falls on a second portion of the array.

25. The method of claim 24 including the step of:
C. mounting the first and second reflecting means to rotate about first and second axes respectively.

26. The method of claim 24 further including the step of:
D. positioning third reflecting means to reflect radiation from a third line on the object so that it falls on a third portion of the array.

27. The method of claim 26 further including the step of:
E. mounting the first, second and third reflecting means to rotate about first, second and third axes respectively.

* * * * *